Figures 1, 2, 3:
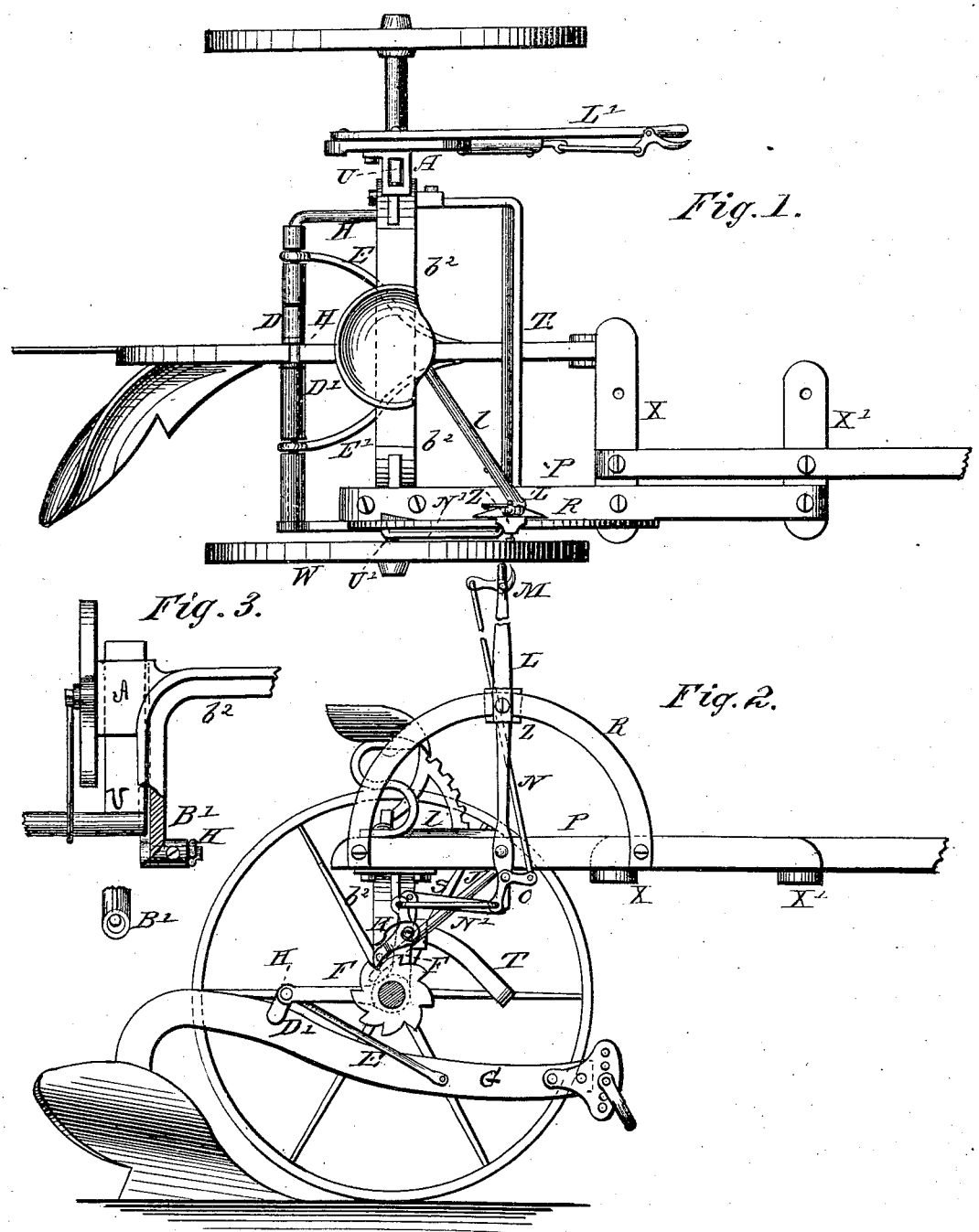

I. R. GILBERT.
WHEEL-PLOW.

No. 184,610. Patented Nov. 21, 1876.

WITNESSES:
P. C. Dieterich
W. C. McArthur

INVENTOR
I. R. Gilbert
per
J. H. Alexander
ATTORNEY.

UNITED STATES PATENT OFFICE.

ISAAC R. GILBERT, OF LOUISVILLE, KENTUCKY.

IMPROVEMENT IN WHEEL-PLOWS.

Specification forming part of Letters Patent No. 184,610, dated November 21, 1876; application filed October 31, 1876.

*To all whom it may concern:*

Be it known that I, ISAAC R. GILBERT, of Louisville, in the county of Jefferson and State of Kentucky, have invented certain new and useful Improvements in Wheel-Plows; and I do hereby declare that the following is a full, clear, and exact description thereof, reference being had to the accompanying drawings, and to the letters of reference marked thereon, which form part of this specification.

The nature of my invention consists in certain improvements on the wheel-plow for which Letters Patent were granted to me May 19 and December 29, 1874, as will be hereinafter more fully set forth.

In the annexed drawings, Figure 1 is a plan view. Fig. 2 is a side elevation with the wheel W removed, and Fig. 3 is a detail of my invention.

P represents a beam, which has secured on its front end a cross-bar, X. At a suitable distance from the front end is another crossbar, X'. These cross-bars are intended to carry the tongue, and each is provided with two sets of holes for the purpose of securing the tongue in place—one set when three horses are used, and the other set when four horses are used. On one side of the beam P is attached a half-circle, R, and also the adjusting or lifting lever L, the half-circle R having a stop-lug for the purpose of holding the lever when the plow is thrown out of the ground. On the circle R is also an adjustable locknotch, Z, which is provided with a set-screw, and can be moved forward or back, for the purpose of locking the plow in the ground at any required depth. The rear end of the beam P is secured to a platform on one of the upper corners of a cast-iron arch, $b^2$, on the other corner of which is a vertical socket-box, A, through which is passed the vertical part of the L-shaped spindle U. The lower portion of the same side of the arch $b^2$ is formed into a slotted or groove-shaped arm, for the purpose of strengthening and more securely steadying the vertical part of the spindle U. The lower end of this slotted or grooved arm is formed into a horizontal socket, B', for the purpose of holding a revolving plug, which has on its outer end an eccentric pin. This plug is held in place by means of a set-screw, and is for the purpose of leveling or adjusting the plow. The other lower end of the arch $b^2$ is formed into another horizontal socket, and provided with another set-screw, for the purpose of holding the spindle U', on which is placed an L-shaped lever, F, which has secured to one end the shaft H. This shaft has on its other end a forward-projecting arm, which is pivoted on the eccentric pin in B'. On the shaft H is placed the lip-shaped sleeve D D', and also the braces E E', all of which are rigidly secured to the side of the plowbeam, and for the purpose of holding the plow in place, and allowing it to adjust itself when going into the ground, while in the ground, and when coming out of the ground, and also for the purpose of holding the plow rigidly in line with the wheels. On the outer end of the spindle U' is placed a wheel, W, which has secured to its hub a notched or rag wheel. To the side of the L-shaped lever F is attached an L-shaped pawl, which is pivoted upon the collar-bolt, the upper end of which is attached to a rod, N', the other end of said rod being attached to an L-shaped lever, O, which is pivoted at a suitable place on the lever L. The other end of the lever O is attached to one end of a rod, N, and the other end of this rod is attached to one end of an L-shaped latch, M, which is pivoted at a suitable place on the lever L, and the lower end of said lever is attached to the L-shaped lever F by a connecting rod or bar, S, and all for the purpose of lifting the plow out of the ground, with the assistance of the wheel W, while in motion. Under and to the beam P is secured one end of a brace, J, the other end thereof being formed into an inclined lug and secured to the side of the arch $b^2$, which inclined end forms a slide for the outward-projected lug on a pawl, K, for the purpose of raising said pawl automatically out of the notches of the ragwheel on the wheel W, when the plow is raised to the proper height. The pawl K is provided with a spring, which holds the pawl out of the notches on the rag-wheel while in motion, when not being held in by means of the L-shaped latch M. The brace $l$ is for the purpose of more firmly securing the beam P to the arch $b^2$. The brace T is for the purpose of checking the plow-beam G when it has raised high enough to let the point out of the ground, and holding the plow-beam down until the heel of the plow has raised to a suitable height. The lever L' is made in the same way, and provided with its ratchet and pawl and its connecting-rod to the spindle, for the same purpose as described in my patent of December 29, 1874. The arch $b^2$ is used in place of certain arms described in said patent, when the plow is placed in front of the wheel.

Having thus fully described my invention, what I claim as new, and desire to secure by Letters Patent, is—

1. The combination of the plain half-circle R, provided with the stop-lug, as described, the movable lock-notch Z, adapted to be fastened at any point on the circle by a set-screw, and the lever L, all as and for the purposes herein set forth.

2. The combination of the horizontal sockets B B', socket or box A, and the platform supporting the beam P, all in one solid arch, $b^2$, substantially as herein set forth.

3. The combination of the arch $b^2$, socket B', with adjustable plug having eccentric pin on its inner end, and the crank-shaft H, with arm placed on said pin, substantially as and for the purposes set forth.

4. The rag-wheel on the wheel W, the pawl K, provided with spring and extended lug, the brace J, with inclined lug end, and their connections with the lever L and latch M, substantially as for the purposes herein set forth.

In testimony that I claim the foregoing as my own I affix my signature in presence of two witnesses.

ISAAC R. GILBERT.

Witnesses:
SAML. J. LOOK,
HENRY H. McDOUGALL.